United States Patent
Emms

(10) Patent No.: US 6,810,628 B2
(45) Date of Patent: Nov. 2, 2004

(54) JOINTING DEVICE

(75) Inventor: Phillip John Emms, Queensland (AU)

(73) Assignee: EMMS Investment PTY Ltd., Queensland (AU)

( * ) Notice: Subject to any disclaimer, the term of this patent is extended or adjusted under 35 U.S.C. 154(b) by 48 days.

(21) Appl. No.: 10/212,798

(22) Filed: Aug. 7, 2002

(65) Prior Publication Data

US 2003/0031077 A1 Feb. 13, 2003

(30) Foreign Application Priority Data

Aug. 9, 2001 (AU) .............................................. PR6909

(51) Int. Cl.[7] .............................................. E04B 7/04
(52) U.S. Cl. ........................ 52/92.2; 52/712; 52/93.1; 52/93.2; 52/655.1; 52/647; 403/232.1; 403/364
(58) Field of Search .......................... 52/127.1, 489.1, 52/633, 647, 646, 653.1, 655.1, 92.2, 93.1, 93.2, 289, 702, 222, 273, 639, 643, 712, 732.1; 403/232.1, 364

(56) References Cited

U.S. PATENT DOCUMENTS

| | | | | |
|---|---|---|---|---|
| 3,414,300 A | * | 12/1968 | Spane | 403/300 |
| 3,785,108 A | * | 1/1974 | Satchell | 52/645 |
| 4,335,555 A | * | 6/1982 | Southerland et al. | 52/639 |
| 5,660,005 A | * | 8/1997 | Tacoma | 52/93.2 |
| 5,890,339 A | * | 4/1999 | Willis | 52/640 |
| 5,966,890 A | * | 10/1999 | Inman | 52/653.2 |
| 5,983,577 A | * | 11/1999 | Hays | 52/79.1 |
| 6,401,422 B1 | * | 6/2002 | Olden | 52/645 |

FOREIGN PATENT DOCUMENTS

| | | |
|---|---|---|
| DE | 27 14 300 | 10/1978 |
| EP | 0 150 970 A2 | 8/1985 |
| WO | 98/11307 | 3/1998 |

* cited by examiner

Primary Examiner—Carl D. Friedman
Assistant Examiner—Chi Q. Nguyen
(74) Attorney, Agent, or Firm—Young & Thompson

(57) ABSTRACT

A jointing device for joining elongate members in a building structure includes a first body section, a second body section, and a connection portion interconnecting the first and second body sections. Each body section has at least one flange portion for fixing to one elongate member. The body sections and the connection portion are formed from a single blank of sheet material with foldlines arranged for bending thereabout to form the at least one flange portion of each of the body sections and a further foldline forming the connection portion. The connection portion is arranged so that the body sections are positionable relative to each other for selectively adjusting angle therebetween to correspond to a roof pitch of the building structure, the roof pitch being within a range of roof pitches.

19 Claims, 5 Drawing Sheets

JOINTING DEVICE

TECHNICAL FIELD OF THE INVENTION

THIS INVENTION relates to a jointing device adaptable for joining elongate members for a range of roof pitches of a building structure.

BACKGROUND OF THE INVENTION

Buildings generally have a number of elongate structural members that are joined together. For example, roof trusses are joined together at their apexes for pitched roofs, and to respective uprights. The buildings may have a flat roof, a roof with 15° roof pitch, 30° roof pitch, or any other angled roof pitch design.

It is known to join elongate structural members with plate-shaped jointing devices fixed one side of the structural members. These jointing devices must be cut to specific shapes for the roof pitches of the building structures. The joints so formed are structurally weak and prone to failures as they are only fixed to one side of the structural members. The ends of the elongate members at the joints are exposed and must be shaped by cutting or otherwise in order to have an acceptable appearance.

Where the elongate members are C-shaped steel sections, the plate-shaped jointing devices are invariably fixed to the bight portions of the sections. The open side of the C-sections can be deformed easily.

These prior art devices require the elongate members for joining to be physically held together while fixing a jointing device thereto. At least one additional worker or a expensive hold-down tool must be employed for holding the elongate members together.

The applicant is aware of a portable framed building system proposed in U.S. Pat. No. 5,660,005 in the name of Tacoma. This building system uses jointing devices in the form of hip receivers (18) as knee jointing devices for joining an upright to a roof truss, and ridge receivers (12) as apex jointing devices for joining adjacent roof trusses. The receivers (12 and 18) proposed in this patent is made from a casting processes and are made for joining structure members of a specific roof pitch. The casting process requires a moulds specifically for the hip receivers (18), and moulds specifically for the ridge receivers (12). For joining an upright to a roof truss member the receivers (18) have a distinctive sleeve for a roof truss member and a distinctive sleeve for an upright. The sleeves are defined by internal wall members. Similarly formed sleeves are also present in the ridge receivers (12). Different moulds must be used for manufacturing receivers for different roof pitch. Accordingly, apart from a complex design, being cast, these prior art devices are costly to manufacture in terms of costs of machinery needed to produce them, material costs and time.

The applicant previously proposed a jointing device in Australian patent application numbered 47531/99. This jointing device is formed by bending about predefined fold lines of a precut sheet meta blank. The processes for manufacturing this jointing device involve a cutting process for cutting blanks of a predetermined shape from a sheet of metal such as steel, and a process for defining fold lines for bending to form a jointing device specifically for either a knee joint for a roof truss and an upright, or an apex joint for adjacent roof trusses. In either case, the device is for a specific roof pitch. The manufacturing processes are considerably simplified and more efficient when compared to the casting process.

The prior art jointing devices therefore are specifically for a knee joint or an apex joint of a particular roof pitch Accordingly, traders these devices need to stock sets of knee jointing devices and apex jointing devices for various standard roof pitches. These jointing devices being fixed for a specific standard roof pitch can not be adapted for a non standard roof pitch.

OBJECT OF THE PRESENT INVENTION

An object of the present invention is to alleviate or to reduce to a certain level one or more of the prior art disadvantages.

OUTLINE OF THE INVENTION

In one aspect therefore the present invention relates to a jointing device for joining elongate members in a building structure. The device includes a first body section, a second body section, and a connection portion interconnecting the first and second body sections, each said body section having at least one flange portion for fixing to one elongate member. The body sections and the connection portion are formed from a single blank of a sheet material with foldlines arranged for bending thereabout to form the at least one flange portion of each of said body sections and a further foldline forming the connection portion. The connection portion is arranged so that the first and second body sections are positionable relative to each other for selectively adjusting angle therebetween to correspond to a roof pitch of the building structure, the roof pitch being within a range of roof pitches. Thereby, the device can be selectively adjusted for joining adjacent elongate members of any building structure having a roof pitch within said range of roof pitches.

The jointing device may be formed for use as a knee joint or an apex joint.

In another aspect therefore the present invention relates to a jointing device for joining elongate members in a building structure. The device comprises a first body section, a second body section, and a connection portion interconnecting the first and second body sections, each said body section having at least one flange portion for fixing to one elongate member. The connection portion is arranged so that the first and second body sections are positionable relative to each other for selectively transforming said device between an apex joint configuration and a knee joint configuration. Thereby, the device can be selectively transformed for joining elongate members in an apex location or a knee location of the building structure.

In preference, each said body section has two spaced flange portions extending from a web portion. The spaced flange portions and the web portions are arranged to form a cavity therebetween, and a first opening adjacent to the free end of one of the web portions and a second opening adjacent to the free end of the other of the web portions, said first and second openings being in communication with said cavity and adapted for said elongate members to extend into the cavity for fixing therein.

The connection portion may be arranged to interconnect the web portions or be formed integrally with the web portions. Typically, the connection portion is a fold line formed between the web portions, and the first and second sections are positionably adjustable about the fold line.

At least one of the web portions has an opening arranged so that the elongate member extending into one of said first and second openings can pass therethrough. The elongate member in this case can be an upright or a roof truss member of the building structure.

The web portion(s) is advantageously formed with a cut-out part(s) that can be selectively removed for revealing said opening(s).

In preference, said range of roof pitches is from 0° to 70°. The 0° roof pitch is for a flat roof structure.

In use, a first elongate member is positioned in said cavity through the first opening in said first section, and a second elongate member is positioned in said cavity through the second opening in said second section, and the first and second elongate members in said cavity can be joined by fixing them to the jointing device.

The device can be formed from a blank with foldlines for bending therealong to form said flange portions about said web portions. The blank can be configured with the connection potion being in the form of a foldline interconnecting said web portions.

In preference, the flange portion or at least one of flange portions of each said body section includes one or more skirt elements formed remotely from said web portion. Where each said body section has spaced flange portions, the one or more skirt elements extending from one flange portion towards the opposite flange portion.

The device may be formed with means for facilitating fixing to the elongate members. Suitably said facilitating means are guide holes for fixing means such as nails, bolts, nuts, screws, staples or the like.

It is preferred that for each body section or one of the skirt elements extends to the first or second opening, thereby forming a support edge for the elongate member extending therethrough.

Said elongate members may be solid, hollow or a combination thereof. They may be in the form of a C or U sections, or T or I sections, or a combination thereof. Each said elongate member may have two of said sections positioned back to back.

Conveniently each said web portions has the opening so that when used as a knee join an elongate member can enter the cavity through the first or second opening and extend through the opening remote from said first or second opening so that the elongate member can form an eave support structure.

One or both said flange portions may have one or more observation holes for checking the elongate members in the cavity thereof.

In a further aspect therefore the present invention resides in a building structure comprising at least one pair of spaced upright elongate members and one or more roof truss elongate members spanning the or each pair of the elongate members. Each of the upright elongate member is joined to the or each said roof truss elongate members by the device as hereinbefore described.

It is preferred that where the building structure includes two or more roof truss elongate members, adjacent roof truss elongate members are joined by the device as hereinbefore described.

The building structure may be a portal frame structure for a carport, garage, shed, dwelling or the like buildings.

BRIEF DESCRIPTION OF THE DRAWINGS

In order that the present invention can be readily understood and put into practical effect the description will now refer to the accompanying drawings which illustrate non-limiting embodiments of the present invention, and wherein.

DETAILED DESCRIPTION OF THE DRAWINGS

Figure 1:
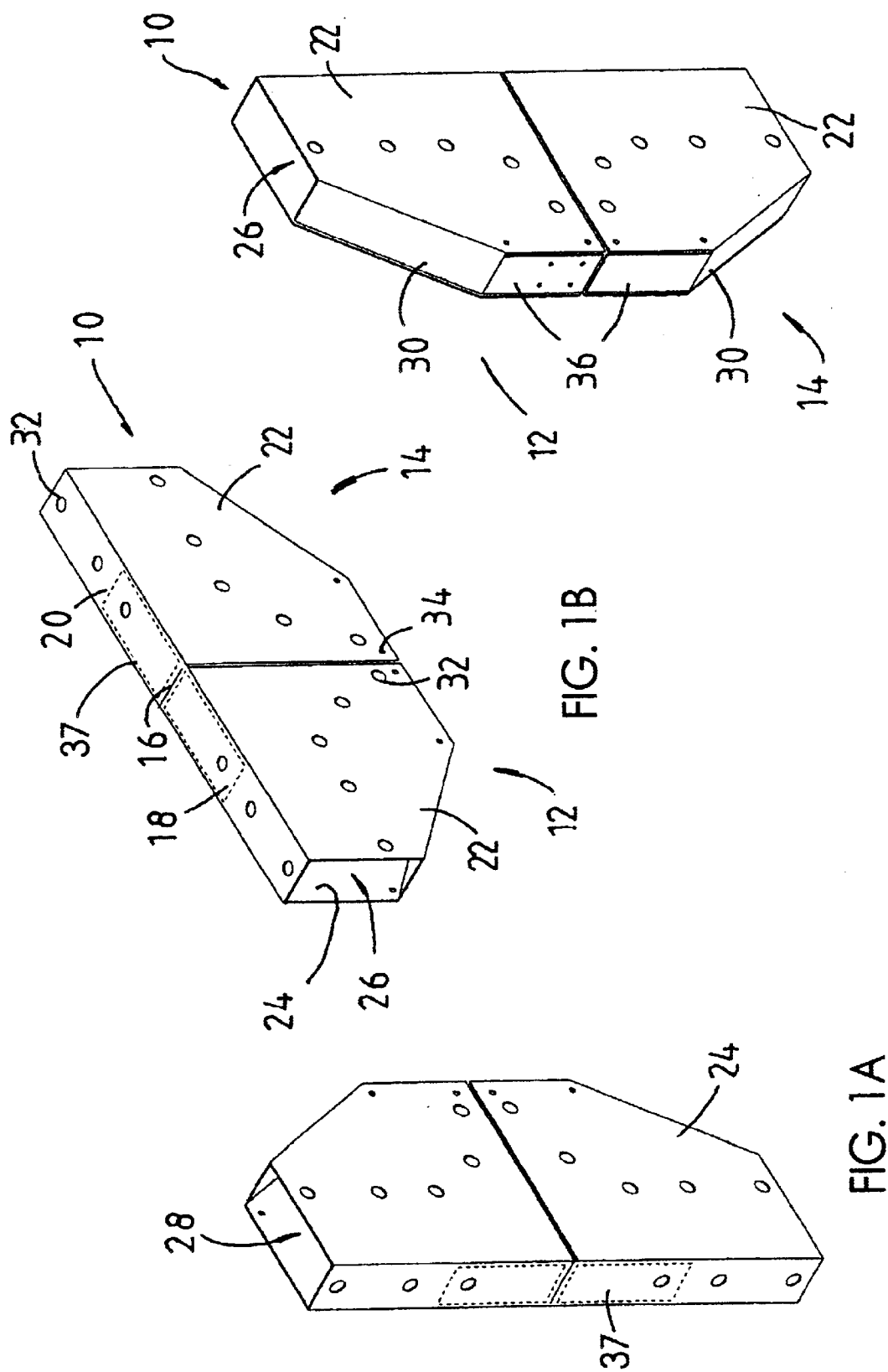
FIG. 1 shows schematically an embodiment of a set of jointing devices adjusted for a flat or 0° pitch roof structure of a building.

Referring initially to FIG. 1 there is shown a schematic view of a set of three jointing devices 10 according to an embodiment of the present invention. Each of the devices 10 have a first body section 12 and a second body section 14 connected together by a connection portion 16 which in this case is a foldline between web portions 18 and 20. Extending from each of the web portions 18 and 20 are spaced flange portions 22 and 24. Foldlines (not shown) are provided for the portions 22 and 24 to bend thereabout from the respective web portions (18 and 20.

The first and second sections 12 and 14 respectively have a first opening 26, and a second opening 28, for elongate members to enter into the cavity defined between the flange portions 22 and 24.

Skirt elements 30 extend from free ends of the flange portions 22 and 24 to partially cover the cavity A number of through holes 32 and 34 are arranged in the first and second sections 12 and 14 for use as observation holes and as guides for fixing means.

In this set, the devices 10 are adjusted for joining elongate members of a flat roof structure. As such, the web portions 18 and 20 are 180° from each other.

Figure 2:
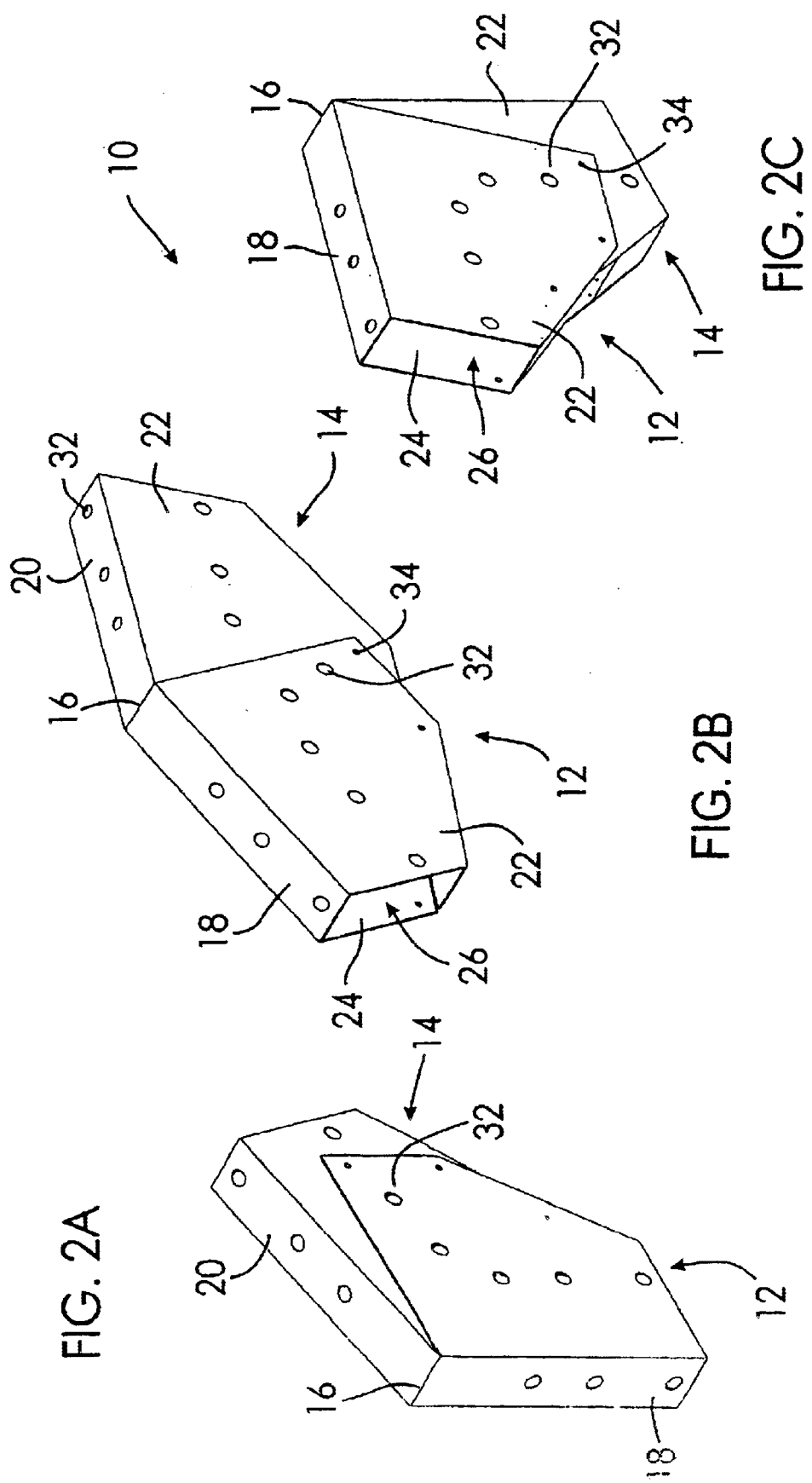
FIG. 2 shows schematically the set of jointing devices shown in FIG. 1 adjusted for a 15° pitch roof structure of a building.
Figure 3:
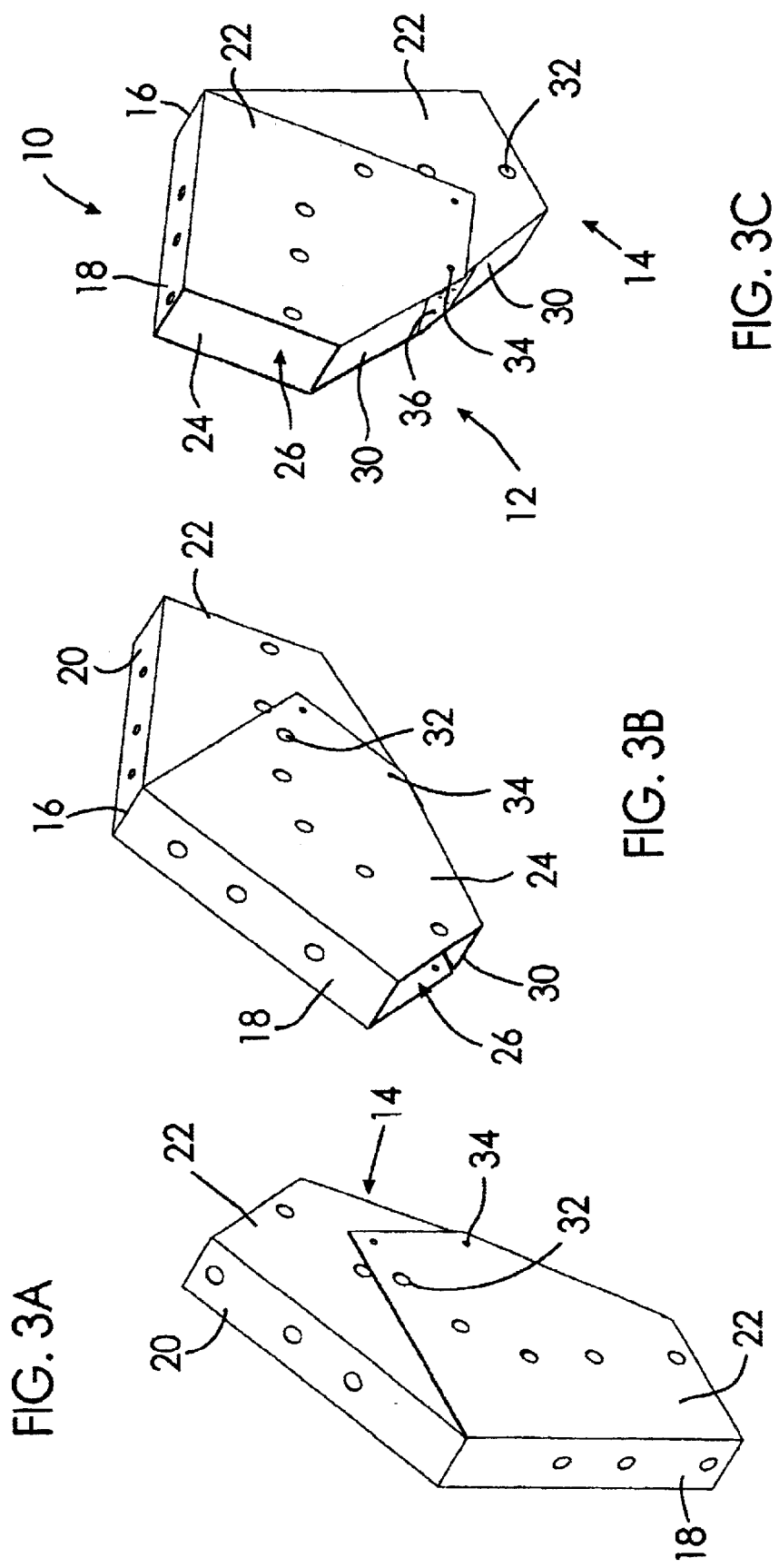
FIG. 3 shows schematically the set of jointing devices shown in FIG. 1 adjusted for a 30° pitch roof structure of a building.

The sections 12 and 14 shown in FIG. 1 can be bent about the foldline 16 into the configurations as shown in FIG. 2 for a roof structure with a 15° roof pitch, or as shown in FIG. 3 for a roof structure with a 30° roof pitch. As can be seen in FIGS. 2 and 3, the sections 22 and 14 are now in an overlapping relationship. The extents of overlapping depends on whether the device 10 is for an apex joint or for a knee joint, and the angle for the roof pitch of the roof structure.

In the embodiment shown, each of the skirt elements 30 has a lip 36 that can be bent into the cavity and towards the element 30 for facilitating adjustment of the angle between the web portions 18 and 20 to suit a particular roof pitch and for transforming from an apex joint configuration to a knee joint configuration, and vice versa. If desired, the lips 36 can simply be cut.

It should be noted, that the sections 12 and 14 can be arranged so that bending or cutting of the lips 36 is not necessary when making adjustment to the angle to suit different roof pitches.

Figure 4:
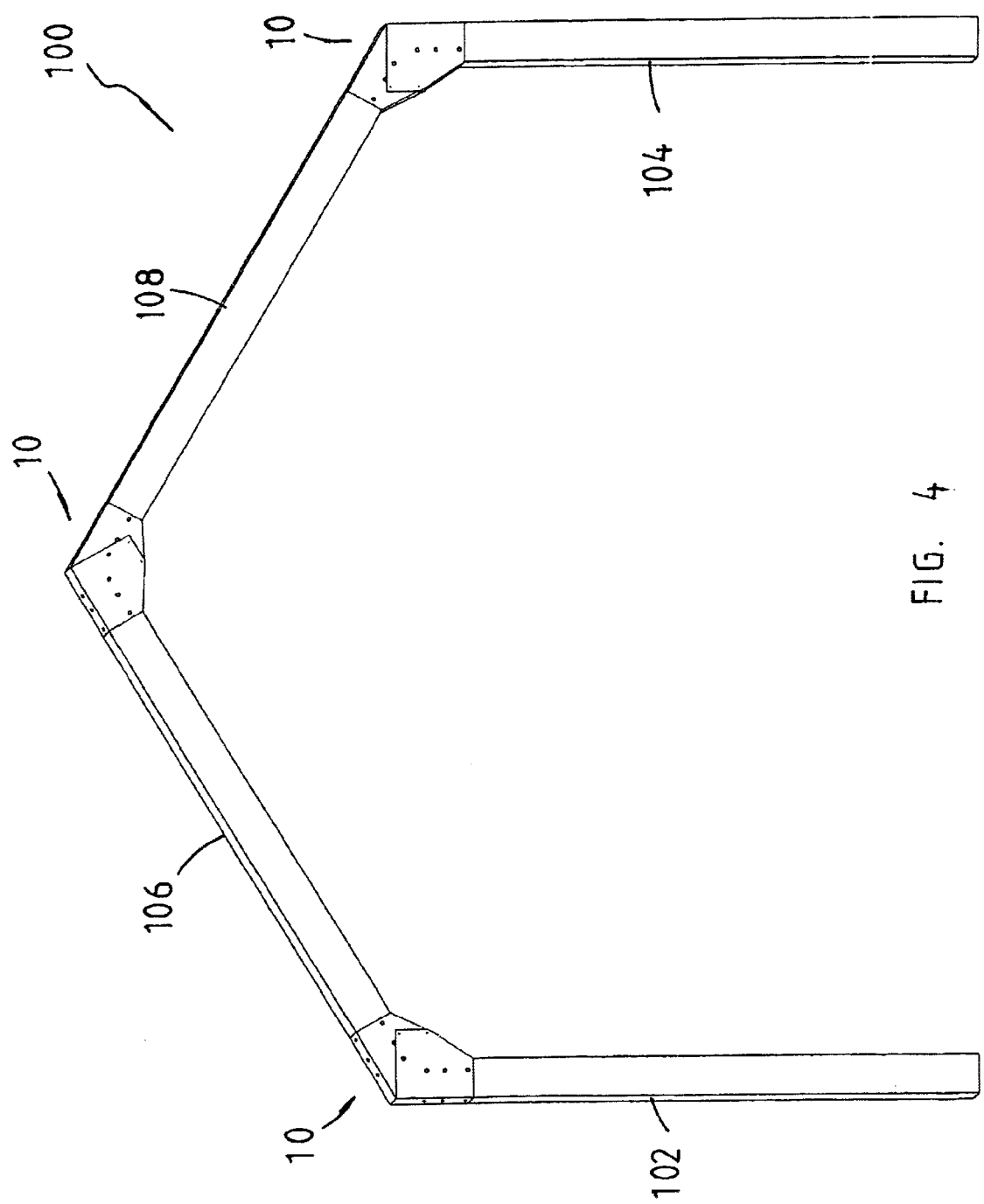
FIG. 4 is a plan view of a partial 30° pitch portal building structure employing embodiment of the jointing device shown in FIG. 3.

FIG. 4 shows a partial view of a frame structure 100 for a building in the form of a shed in this embodiment of the invention. The frame structure 100 has a pair of spaced elongate upright members which in this case are C-section leg purlins 102, 104 and a pair of roof truss elongate member which in this case are C-section roof purlins 106, 108.

The leg purlins 102, 104 are joined to respective roof purlins 106, 108 by an embodiment of the device 10 according to the present invention transformed as a knee joint device. The roof purlins 106, 108 are joined together by the device 10 according to the present invention transformed as an apex joint device.

While not shown, it should be understood that fixing means such as screws, bolts, rivets and the like can be used to fix the devices 10 to the purlins 102 to 108. Preformed fixing holes 32 and 34 are provided for guiding the fixing means.

When used for a knee joint, the device 10 has its second opening 28 positioned for one of the roof truss purlins 106 or 108 to enter the interior cavity of the device 10 and its first opening 26 for the leg purlin 102 or 104 to enter the interior cavity as shown in FIG. 4.

Figure 5:
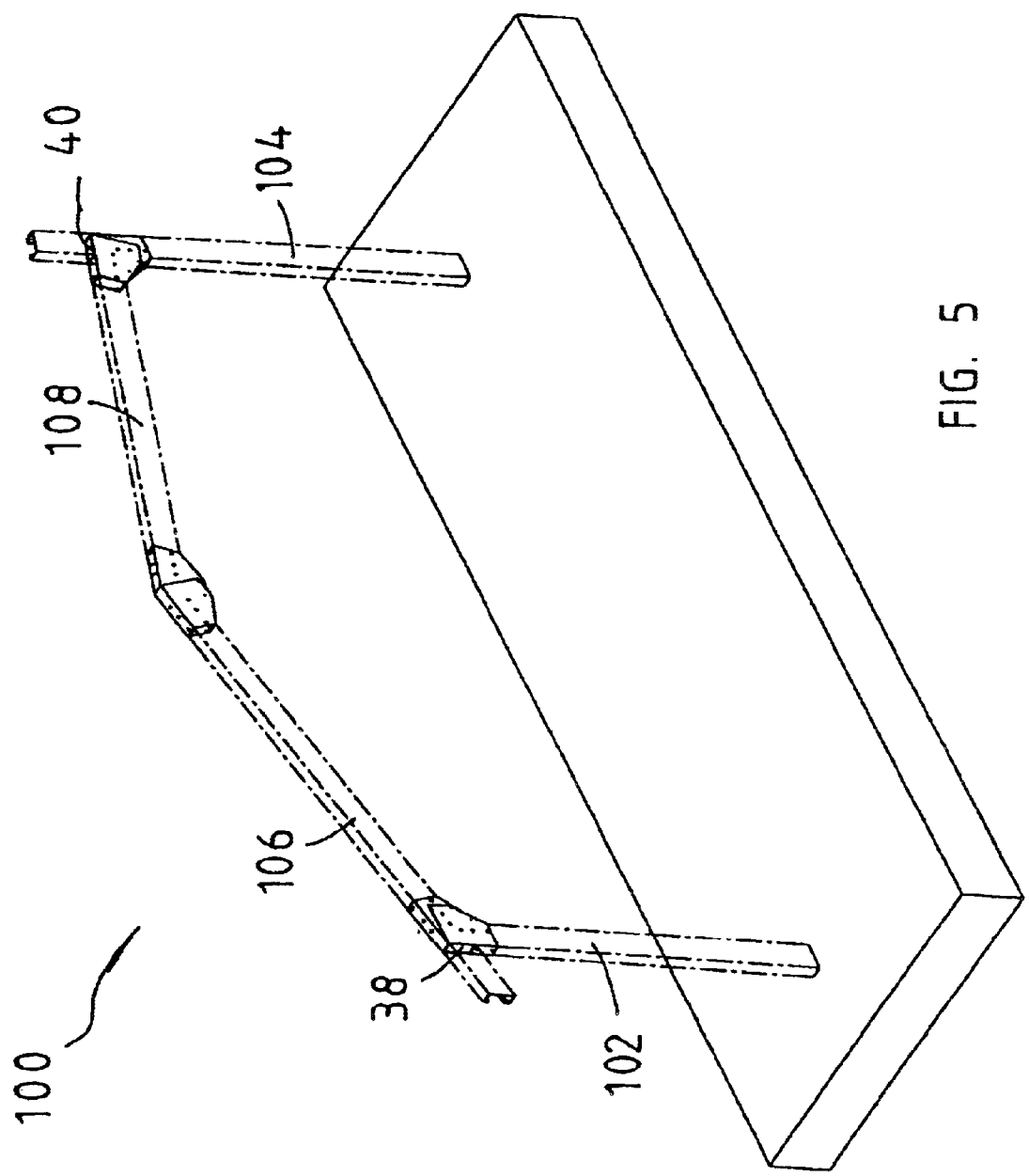
FIG. 5 is a plan view of a partial 15° pitch portal building structure employing another embodiment of the jointing device according to the present invention.

If the roof truss purlins 106 and 108 are to be used as an eave support, the cut-out parts 37 in one of the web portions 18 and 20 can be removed to reveal a third opening 38 for the roof truss purlins 106 and 108 to extend through the devices 10 to form an eave support as shown in the left of the drawings shown in FIG. 5. If the leg purlins 102 and 104 need to be extended through the devices 10, the cut-out parts in the other of the web portions 18 and 20 can be removed to allow the purlins 102 and 104 to extend therethrough as shown in the right of the drawings shown in FIG. 5.

Whilst the above has been given by way of illustrative example of the present invention many variations and modifications thereto will be apparent to those skilled in the art without departing from the broad ambit and scope of the invention as herein set forth.

I claim:

1. A jointing device for joining elongate members in a building structure, the device includes a first body section, a second body section configured substantially as a mirror image of said first body section, and a connection portion interconnecting the first and second body sections, each said body section having a web portion, a pair of spaced flange portions extending from the web portion and are arranged for fixing to one elongate member, and the body sections and the connection portion being formed from a single blank of a sheet material with foldlines arranged for bending thereabout to form the spaced flange portions of each of said first and second body sections and a further foldline forming the connection portion; the connection portion being arranged so that the first and second body sections are positionable relative to each other for selectively adjusting angle therebetween to correspond to a roof pitch within a range of roof pitches, whereby the device can be selectively adjusted for joining adjacent elongate members of any building structure having a roof pitch within said range of roof pitches, the connection portion being arranged to join the web portions of the first and second body sections so that each of said web portions having a free end, the spaced flange portions and the web portions being arranged to form a cavity therebetween, and a first opening adjacent to the free end of the web portions of the first body section and a second opening adjacent to the free end of the web portions of the second body section, said first and second openings being in communication with said cavity and arranged to receive said elongate members so as to extend into the cavity for fixing therein, at least one of the spaced flange portions of each of the first and second body sections having a skirt element formed remotely from the corresponding web portion and extending from corresponding one of the first and second openings in a plane that is at a substantial angle to the corresponding web portion, the skirt elements each having a bendable lip at a position remote from the corresponding one of the first and second openings and being arranged to be normally in a plane that is substantially parallel to that of the corresponding web portion and bendable for positioning to extend into the cavity to facilitate bending of the first and second sections about the connection portion.

2. The device according to claim 1 wherein the first and second body sections are configured to be adjustably positionable to form a knee joint or an apex joint.

3. The device according to claim 1 wherein at least one of the web portions has an opening arranged so that the elongate member extending into one of said first and second openings can pass therethrough.

4. The device according to claim 3 wherein the at least one web portion is formed with a cut-out part that can be selectively removed for revealing said opening.

5. The device according to claim 1 wherein said range of roof pitches is from 0° to 70°.

6. The device according to claim 1 wherein the one or more skirt elements extending from one flange portion towards the opposite flange portion.

7. The device according to claim 1 wherein the device is arranged so that for each body section or one of the skirt elements extends to the first or second opening, thereby forming a support edge for the elongate member extending therethrough.

8. The device according to claim 1 wherein further including means for facilitating fixing of the device to the elongate members.

9. The device according to claim 3 wherein each said web portion has the opening so that when used as a knee join an elongate member can enter the cavity through the first or second opening and extend through the opening remote from said first or second opening so that the elongate member can form an eave support structure.

10. The device according to claim 1 wherein one or both said flange portions having one or more observation holes for checking positions of the elongate members in the cavity thereof.

11. The device according to claim 1 wherein the device is arranged so that a first elongate member is positionable in said cavity through the first opening in said first section, and a second elongate member is positionable in said cavity through the second opening in said second section, and the first and second elongate members in said cavity can be joined by fixing them to the jointing device.

12. A jointing device for joining elongate members in a building structure, the device includes a first body section, a second body section, and a connection portion interconnecting the first and second body sections, each said body section having at least one flange portion for fixing to one elongate member, and the body sections and the connection portion being formed from a single blank of a sheet material with foldlines arranged for bending thereabout to form the at least one flange portion of each of said body sections and a further foldline forming the connection portion; the connection portion being arranged so that the first and second body sections are positionable relative to each other for selectively adjusting angle therebetween to correspond to a roof pitch within a range of roof pitches, whereby the device can be selectively adjusted for joining adjacent elongate members of any building structure having a roof pitch within said range of roof pitches, wherein, each of said body sections has two spaced flange portions extending from a web portion, the connection portion being arranged to join the web portions of adjacent body sections so that each said web portion having a free end, the spaced flange portions and the web portions being arranged to form a cavity therebetween, and a first opening adjacent to the free end of one of the web portions and a second opening adjacent to the free end of the other of the web portions, said first and second openings being in communication with said cavity and adapted for receiving said elongate members so as to extend into the cavity for fixing therein, the connection portion is arranged to interconnect the web portions or be formed integrally with the web portions, and the web portion is formed with a cut-out part that can be selectively removed for revealing said opening.

13. The device according to claim 12 wherein at least one of the web portions has an opening arranged so that the elongate member extending into one of said first and second openings can pass therethrough.

14. The device according to claim 12 wherein said range of roof pitches is from 0° to 70°.

15. The device according to claim 12 wherein the flange portion or at least one of flange portions of each said body section including one or more skirt elements formed remotely from said web portion.

16. The device according to claim 15 wherein each said body section has spaced and opposed flange portions, the one or more skirt elements extending from one flange portion towards the opposite flange portion.

17. The device according to claim 16 wherein the device is arranged so that for each body section or one of the skirt elements extends to the first or second opening, thereby forming a support edge for the elongate member extending therethrough.

18. The device according to claim 12 wherein further including means for facilitating fixing of the device to the elongate members.

19. The device according to claim 12 wherein one or both said flange portions having one or more observation holes for checking positions of the elongate members in the cavity thereof.

* * * * *